United States Patent [19]
Andersen

[11] 3,856,368
[45] Dec. 24, 1974

[54] FLUID SEAL FOR BEARING ASSEMBLY

[76] Inventor: Kare Andersen, 832 Carol Ave., Elgin, Ill. 60120

[22] Filed: May 25, 1973

[21] Appl. No.: 363,829

Related U.S. Application Data

[63] Continuation of Ser. No. 147,990, May 28, 1971, abandoned.

[52] U.S. Cl. .......................................... 308/187.2
[51] Int. Cl. ............................................ F16c 33/78
[58] Field of Search ...................... 308/187.1, 187.2

[56] References Cited
UNITED STATES PATENTS

| | | | |
|---|---|---|---|
| 2,834,616 | 5/1958 | Gebert et al. | 308/187.1 |
| 2,873,153 | 2/1959 | Haynie et al. | 308/187.2 |
| 3,306,683 | 2/1967 | Deuring | 308/187.2 |
| 3,519,316 | 7/1970 | Gothberg | 308/187.2 |
| 3,531,168 | 9/1970 | Bainard | 308/187.1 |
| 3,594,050 | 7/1971 | Gothberg | 308/187.2 |
| 3,614,183 | 10/1971 | Berens | 308/187.1 |

*Primary Examiner*—Charles J. Myhre
*Assistant Examiner*—R. H. Lazarus

[57] ABSTRACT

A unitized bearing assembly is disclosed which includes a seal for preventing loss of fluid between the bearing race and a slip-fit part against which the bearing assembly is disposed. The seal structure includes a flexible sealing element which is squeezed in a recess between the slip-fit part and a collar extending axially from the adjacent bearing race to provide a fluid-tight seal. The squeezing can result from the relative dimensioning and shaping of the sealing element and recess, or from an axial load on the sealing element within the recess, or both.

In a preferred embodiment, a unitized bearing assembly includes an attached, replaceable lubricant seal with an elastomeric snap-on bead feature. Expansion of the bead for mating engagement around the outside surface of an axially extending collar on the outer bearing race provides positive seal retention on this preferred unitized bearing assembly even prior to installation of the bearing. Dimensioning of the elastomer can permit the option of non-interference, or interference fit of the flexible sealing element with the bore in which the bearing is disposed. Axial loading after installation of the unitized bearing assembly in the bore urges the flexible seal material which is trapped in the recess between the race collar and bore radially outwardly against the bore to assure a fluid-tight secondary seal.

5 Claims, 6 Drawing Figures

PATENTED DEC 24 1974 3,856,368

INVENTOR
KARE ANDERSEN
BY Greist, Lockwood, Greenawalt & Dewey
ATT'Y

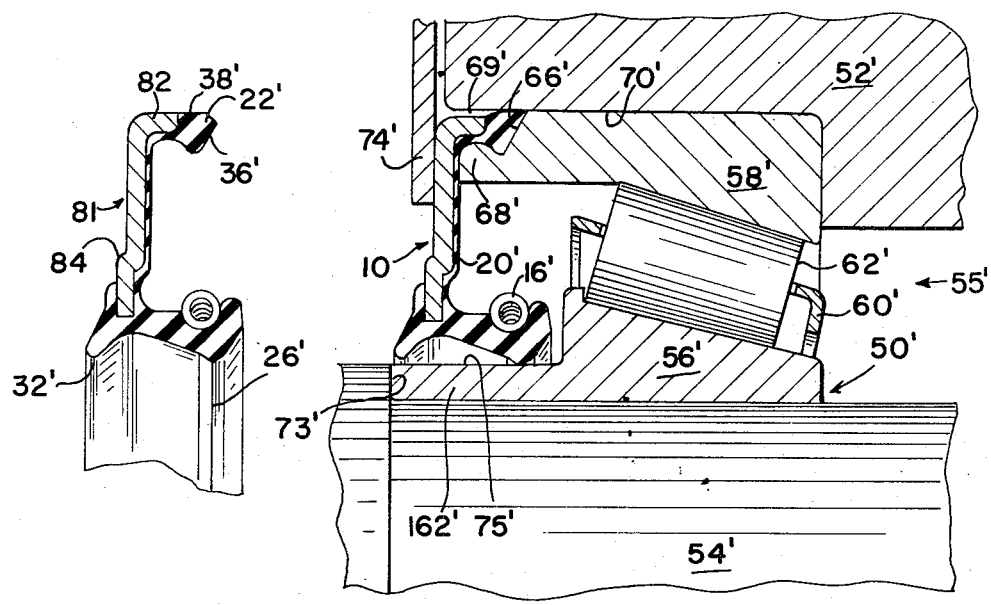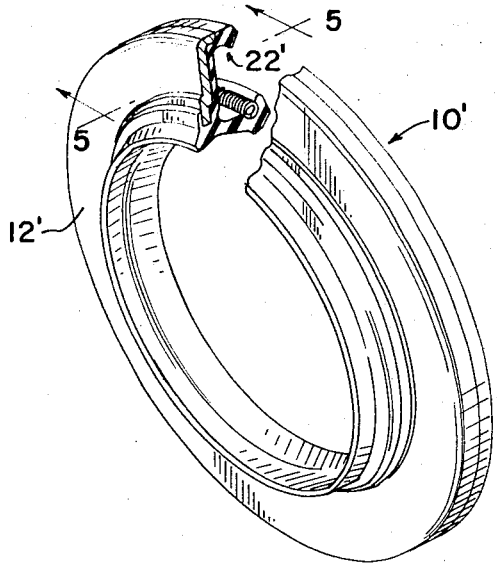

FLUID SEAL FOR BEARING ASSEMBLY

This is a continuation of application Ser. No. 147,990, filed May 28, 1971, now abandoned.

This invention relates to a shaft and bearing seal construction which prevents loss of fluid from between a non-rotatable bearing race and a part against which the bearing assembly is disposed. The invention is applicable with particular advantage in the manufacture of unitized bearings having a self-contained primary lubricant seal element which also provides an effective secondary seal.

Recent developments of bearing assemblies have caused at least one large bearing manufacturer to recognize particularly attractive features of unitized bearings having self-contained shaft seals. Such unitized bearing assemblies, in addition to providing all the necessary and desirable bearing-related structures and features, also include an attached lubricant seal for forming a primary seal around the shaft borne by the bearing assembly. Adequate provision for sealing is essential for retaining a lubricant, such as an oil bath, in an enclosed region in which the bearings are disposed.

However, it has been found that there is a tendency for fluid, such as lubricant, to migrate out of the enclosed bearing region through the relatively narrow passageway between a slip-fit outer race, for example, and the bore in which the outer race is disposed.

It would be highly desirable to provide a seal, for attachment as part of a unitized bearing assembly, which effectively operates as a shaft seal, and which, in effect, also prevents loss of fluid such as lubricant from between the non-rotating bearing race and the adjacent non-rotating part against which the race is positioned. It would also be highly desirable to provide a unitized bearing assembly in which the lubricant seal is merely snapped on during manufacture of the unitized bearing assembly.

Such unitized bearing assemblies, in addition to providing advantages during the manufacture of the bearing assembly, would be highly advantageous to the party incorporating the unitized bearing assembly in a larger manufactured structure. For example, there would be no problem at such a final assembly point as to whether or not a particular separate seal assembly is appropriate for use with the particular bearing assembly. Also, for example, the manufacturer of the final product need not suffer the bother of carrying separate seal assemblies and separate bearing assemblies on inventory, and need not bother coordinating reserves of seal assemblies with reserves of bearing assemblies. Furthermore, the final manufacturer need not suffer the inconvenience of ordering separately an appropriate supply of seal or bearing assemblies, and is not billed separately etc.

It would be highly advantageous to provide a unitized bearing assembly having such a self-contained lubricant seal in which the lubricant sealing member is conveniently attached to and fixed with respect to a non-rotating portion of the bearing assembly and in which the primary seal occurs along a sealing line on a smooth face of a rotating member of the bearing assembly. This eliminates the necessity of polishing a primary seal surface on a rotatable shaft or spindle at the point of installation, and avoids damaging the primary seal line surface during installation of the bearing assembly. In such a unitized bearing assembly, the rotatable portion of the bearing assembly is press-fit onto a rotating shaft to provide a fluid-tight engagement therebetween.

It is an object of the present invention to provide a seal assembly which is readily adaptable for attachment to unitized bearing assemblies. It is an object of a preferred embodiment of the present invention to provide a seal assembly which snaps onto a unitized bearing assembly.

It is another object of this invention to provide a self-contained unitized bearing assembly having a sealing element which is fixed with respect to a first bearing race, and which forms a fluid-tight secondary seal at the first race, which seal assembly forms an operating primary seal along a sealing line on an opposed surface of an element of the unitized bearing which is associated with the second race, the second race being in fluid-tight engagement with a second part.

These and other objects and the desirable features, and other desiderata which were referred to above or which will be apparent hereinafter are all achieved in accordance with the present invention.

The invention will be described in general, and in connection with several particularly preferred embodiments, with the aid of the accompanying drawings in which:

FIG. 4 is a fragmentary perspective view of an alternative seal of this invention;

FIG. 5 is an enlarged fragmentary cross-sectional view taken approximately along the line 5—5 of FIG. 4;

FIG. 6 is a fragmentary cross-sectional view illustrating the seal shown in FIG. 5 in normal operating relation with associated bearing and wheel structures.

Figure 2:
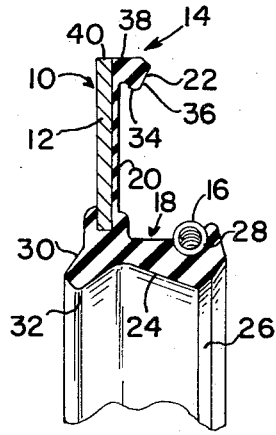
FIG. 2 is an enlarged fragmentary cross-sectional view taken approximately along the line 2—2 of FIG. 1.
Figure 3:
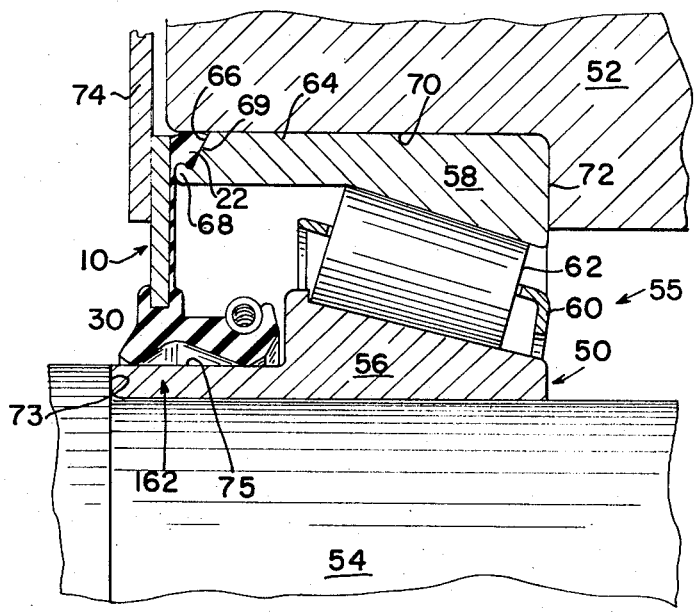
FIG. 3 is a fragmentary cross-sectional view illustrating the seal shown in FIG. 2, in normal operating association with bearing and wheel structures.
Figure 1:
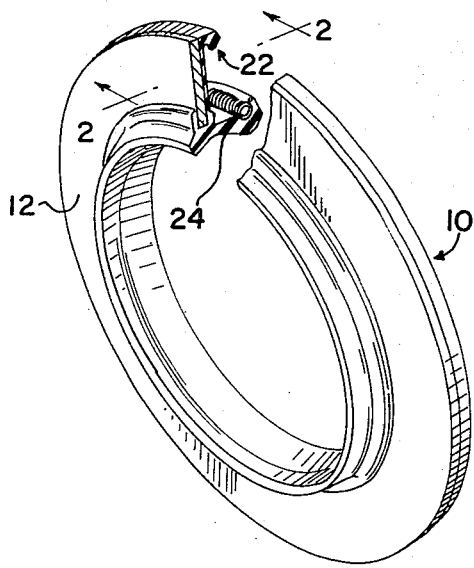
FIG. 1 is a fragmentary perspective view of a preferred shaft seal in accordance with the present invention.

FIGS. 1, 2, and 3 relate to a first preferred embodiment, and FIGS. 4, 5 and 6 relate to a second preferred embodiment.

Referring specifically to the embodiment illustrated in FIGS. 1–3, a first preferred rotary shaft seal in accordance with this invention is generally indicated at 10. Seal 10 comprises three distinct structures, namely rigid, annular, radially extending metallic reinforcing element 12, molded flexible elastomeric portion generally indicated at 14, and garter spring 16. Reinforcing element 12 is substantially a planar annular metallic stamping to which elastomeric portion 14 is permanently bonded.

Elastomeric portion 14 includes a main seal body generally indicated at 18 bonded to a radially inward portion of element 12, facing portion 20, and radially outward axially extending flexible beaded collar portion 22.

For the purpose of completely describing an illustrated preferred embodiment, structural details of main seal body 18 will be included in the following description, but it is to be understood that the present invention is not limited to structures having primary seal elements similar to main seal body 18. Main seal body 18 includes a primary seal portion 24 which extends axially from the radially inward extreme of reinforcement member 12. Primary seal portion 24 includes a radially inwardly extending primary sealing lip 26, and garter spring groove 28 positioned radially outwardly of primary sealing lip 26. Independent garter spring 16 is disposed in garter spring groove 28 under bias and urges primary sealing lip 26 radially inwardly. Frusto-conical surfaces S-1 and S-2 meet to define the seal band S-B of the lip 26.

Extending radially inwardly and axially outwardly from the radially inward extreme of reinforcement member 12 is a second sealing portion 30 which includes excluder lip 32.

Primary seal portion 24, facing portion 20 and outer bead portion 22 of elastomeric element 14 extend generally axially in the direction away from the same side of element 12. This side is referred to hereinafter as the "wet" or "oil" side of seal 10, and the region enclosed by the seal is referred to as the "wet" or "oil" region.

As used herein, the terms axially inwardly and axially outwardly refer to the general directions extending, respectively, axially toward or axially away from the "wet" or "oil" region.

Beaded collar portion 22 extends axially inwardly and includes radially inwardly extending lip 34, radially outwardly extending angular end face 36. The outer or circumferential face 38 of portion 22 extends axially from the circumference 40 of member 12.

Referring now to FIG. 3, seal 10 is shown in operating position in association with a bearing structure generally indicated at 50, a non-rotatable housing generally indicated at 52, and a rotatable shaft spindle generally indicated at 54.

In accordance with the present invention, a unitized bearing assembly 55 comprising seal 10 and bearing assembly 50 is provided as a sub-assembly for installation during manufacture of a vehicle. Bearing assembly 50 comprises an inner race 56, an outer race 58, bearing spacers 60 and bearings 62. It is to be understood that inner race 56 and outer race 58 can be segmented, although for the purpose of simplifying the illustration, inner race 56 and outer race 58 are illustrated as one-piece components.

Inner race 56 includes an axially outwardly extending collar portion 162, and outer race 58 also includes a main axially extending collar portion 64. (Collar 64 corresponds to a rib ring in a conventional segmented outer race). At the axially outward extreme of main collar portion 64, tapered shoulder 66 extends somewhat axially and radially inwardly to axially extending beaded race collar 68. An open ended annular recess 69, the space occupied by flexible seal collar 22, is formed between race collar 68, shoulder 66 and a portion of bore 70.

Bearing assembly 50, and specifically outer race 58 is dimensioned for a press or slip fit within bore 70 of housing 52, and shoulder 72 limits the axial movement of outer race 58 within housing 52.

Inner race 56 is press fit over spindle 54 to provide a fluid-tight attachment. Nonetheless, during installation, the primary seal face 75 is not damaged. In a typical installation, outer race 58 enters bore 70 relatively easily because of a slip fit therebetween. A backing plate 74 is bolted to housing 52 or to a mounting flange (not shown because conventional) and applies and maintains an axial load through metal annular support member 10. The gap between plate 74 and housing 52 is intended to indicate that the plate is urged against element 12, and not against the portion of housing 52 adjacent bore 70.

In the preferred embodiment illustrated in FIG. 3, the dimensioning of elastomeric bead portion 22 is such that when elastomeric bead 34 is mated axially around beaded race collar 68, the elastic material is urged radially outwardly to such a position that when the unitized bearing assembly comprising bearing sub-assembly 50 and seal assembly 10 is installed within bore 70, outer surface 38 of elastomeric beaded collar portion 22 engages bore 70 in a fluid-tight, interference fit. In such an embodiment the interference fit and squeezing of the flexible sealing material within the recess due to the relative size and volume of beaded portion 22, and recess 69, and hence axial loading is not essential, although preferred.

When backing plate 74 is tightened down against rigid member 12, an axial load is applied and the seal 10 is urged against outer race 58. Tapered end face 36 of the elastomeric bead portion 22 is urged axially against tapered shoulder 66, and the elastomeric material is further urged radially outwardly to further assure reliable fluid seal against bore 70.

Referring now to the embodiment illustrated in FIGS. 4, 5 and 6, it will be noted that many parts or structures are substantially identical, or are very similar to parts or structures identified in the discussion relating to FIGS. 1, 2, and 3. These like parts are numbered with the same numbers, except that the numbers are primed, and the discussion identifying these parts is not repeated. Thus, in FIGS. 4, 5 and 6, any number less than 80 was identified in the prior discussion, and those parts identified by a number greater than 80 are identified and discussed hereinafter.

It will be appreciated upon comparing FIGS. 4, 5 and 6 with FIGS. 1, 2 and 3 that rigid metal annular reinforcing element generally indicated at 81 differs from reinforcing element 12 inasmuch as member 81 also includes axially extending collar portion 82 and offset 84 in the radially extending portion 12'. Collar portion 82 is dimensioned to extend partially into recess 69 and this is disposed radially outwardly around race collar 68. This configuration provides increased security of retention by lessening risk of inadvertent disengagement of seal 10' prior to installation of bearing assembly 50 into a wheel housing.

Also, seal 10' differs from seal 10 in that the elastomeric beaded collar 22' is so dimensioned that upon installation over beaded race collar 68', outer surface 38' of elastomeric beaded collar 22' does not provide an interference fit with bore 70'. This failure to achieve an interference fit is believed to provide additional convenience in installation, even though no sealing engagement with bore 70' is immediately achieved. In the specifically illustrated embodiment, axial loading is essential during operation, since insufficient sealing material is present to be squeezed against bore 70' without axial loading. Otherwise, in an alternative embodiment sufficient flexible sealing material could be used in extending portion 22' so that axial loading is not essential. However, upon application of an axial load by backing plate 74' through support plate 81, tapered end face 36' is urged axially against tapered shoulder 66' and the flexible material in bead portion 22 is compressed and urged axially and radially outwardly (and inwardly) with the result that circumferential face 38' sealingly engages bore 70'. Also, as illustrated in FIG. 3, facing portion 20' sealingly bears against the end of race collar 68'.

Hence, it will be appreciated that the embodiment shown in FIG. 6 differs from the embodiment shown in FIG. 3 in that the dimensioning of the embodiment shown in FIG. 6 is such that no interference fit seal is achieved upon installation of the bearing assembly 55', comprising seal 10' and bearing assembly 50', since no interference fit is achieved between bead portion 22' and bore 70'. Otherwise, the specifically described embodiments are similar in that respective elastomeric collar portions 22, 22' are urged radially outwardly against respective bores 70, 70', as a consequence of the axial load applied by respective pressure plates 74, 74'. However, as indicated above, either embodiment could be modified by providing more or less sealing material so that an interference fit would, or would not, respectively, be achieved without axial loading. Both embodiments specifically described herein are in accordance with this invention in that, in each instance, a portion of the elastomeric material is trapped within the recesses formed by the radially outer face of bead collar 68, 68', end face 66, 66' and bore 70, 70', respectively and either dimensioning or the application of an axial load on the elastomer urges deflection of elastomeric material radially outwardly against bores 70, 70'. Also, in each embodiment, the close interface clearance between outer race 58 and bore 70 terminates in the recess referred to above. Thus, it is a characteristic of unitized bearing assemblies of this invention that the interface clearance between the non-rotating race of the bearing assembly and the part against which it is disposed, terminate in an annular, axially extending recess between an axially extending portion of the non-rotating race, and the adjacent non-rotating part, and that the seal assembly includes elastomeric material which is trapped and squeezed within the recess and urged radially, preferably under axial load, to assure complete fluid-tight seal.

Thus, in accordance with this invention, a unitized bearing assembly is provided which includes a fluid seal attached thereto, and which includes a smooth faced primary seal-forming collar member 162, 162' which cooperates with an elastomeric element of the sealing assembly.

Thus, because the unitized bearing assembly includes a self-contained sealing component, considerable improvement and convenience of installation is achieved. Fewer separate parts need be inventoried by the installer. Partly because of the high degree of reliability of the seal in maintaining the lubricant bath in the unitized bearing assemblies of this invention, it is most likely that the life of the bearings will substantially exceed the life of the seal 10. An additional advantage of the unitized bearing sealing system of this invention is the fact that the seal assembly 10 can be replaced with comparative convenience. For example, it is only necessary to lift elastomeric portion 22 around beaded race collar 68, in order to separate seal 10 from bearing assembly 50. Replacement of seal 10 is completed by snapping elastomeric bead portion 22 around beaded collar 68 and reinstallation of plate 74.

In the embodiments specifically described herein, the axially extending flexible beaded collar 22 includes a mating detent for maintaining seal 10 in position on a unitized bearing assembly prior to installation. However, in its broadest aspects, the invention is not restricted to such embodiments, but includes embodiments having an axially extending sealing member trapped in a recess formed by and between a non-rotating bearing member and the structure against which the bearing assembly is disposed. Upon installation, the sealing member is under sufficient axial load in the recess to maintain radially outward sealing pressure against the adjacent parts. It should be emphasized that the relatively narrow passageway between the bearing member and the adjacent part will automatically terminate at a recess defined in this manner, and that the radially outwardly exerted pressure provides a fluid-tight seal against loss of liquid through the passageway between the bearing race and the adjacent part.

It is natural for some elastomeric materials such as rubber to undergo stress relaxation (tensile set) thereby losing hoop tension and compressive load. Also, some of these materials undergo significant shrinkage upon aging. If these materials are snapped into a bore, they could eventually fall out. However, mounted on an outside diameter of a race, in accordance with this invention, shrinkage or stress relaxation causing constriction is an asset.

Specific embodiments of the invention are described herein for the purposes of illustration only, and the invention is not to be limited to the specific disclosure. Many modifications and alterations within the invention will be apparent to those skilled in the art. For example, the secondary seal element can be achieved, in accordance with this invention, by providing a relatively flat mass of flexible sealing material at the "wet" side of the rigid support member 12 which is urged against a radially outwardly tapering face 66 on a collar 64 having no axial collar 68. In such an embodiment, the relatively flat mass of flexible material is urged radially outwardly against bore 70' upon axial loading thereof, as illustrated in connection with the embodiment disclosed in FIGS. 1–3. Other alterations and modifications within the invention will be apparent to those skilled in the art. The invention is to be limited only by the claims hereinafter.

I claim:

1. A unitized bearing and seal assembly comprising in combination, radially inner and outer races, a plurality of rotatable bearings disposed between said inner and outer races and being positioned therein by means of a cage, one of said inner and outer races having an axially extending collar with a radially directed sealing surface thereon, a groove in the other of said races, said groove having an axially extending portion and a radially undercut portion, a seal unit forming a part of said bearing and seal assembly, said seal unit including a relatively rigid, radially extending stiffener portion closing off a major portion of the area lying between said inner and outer races, a sealing lip extending substantially axially outwardly from and bonded to one end of said relatively rigid stiffener, said lip having a seal band portion thereof formed by the convergence of a pair of frusto-conical surfaces, and an annular spring overlying said seal band whereby said seal band is urged into engagement with said sealing surface on said one of said races, and a secondary sealing bead formed on the other end of said stiffener portion, said secondary sealing bead having a bead portion of a shape generally conforming to the shape of said groove and other of said races, whereby an axially directed force on said stiffener will force said secondary sealing head radially outwardly from said groove and into snug sealing engagement with a member fixed with relation to said second race, said bead portion of said secondary sealing bead being adapted when received in said race groove to position and support said seal assembly in relation to said bearing assembly.

2. A unitized bearing and seal assembly as defined in claim 1 which further includes a second seal band portion formed on said sealing lip and spaced axially apart from the area of contact between said seal band portion and said collar.

3. A unitized bearing and seal assembly as defined in claim 1 wherein said secondary sealing bead extends axially toward said bearing, said bead being unsupported throughout a substantial portion of its axial extent whereby said bead may be resiliently deformed outwardly while being snap-fit into said groove whereby said seal assembly may be held in place with respect to said bearing prior to and during installation of said unitized bearing and seal assembly within a machine member.

4. A unitized bearing and seal assembly as defined in claim 1 in which said radially extending stiffener is positioned for engagement by an auxiliary locking member to apply an axial compressive load to said bead portion when said bead portion is confined within said groove.

5. A unitized bearing and seal assembly as defined in claim 1 wherein said relatively rigid, radially extending stiffener includes an axially extending flange formed at the end thereof whereon said bead portion is formed.

* * * * *

PO-1050
(5/69)

UNITED STATES PATENT OFFICE
CERTIFICATE OF CORRECTION

Patent No. 3,856,368  Dated December 24, 1974

Inventor(s) Kare Andersen

It is certified that error appears in the above-identified patent and that said Letters Patent are hereby corrected as shown below:

The patent should have been issued in the name of assignee, namely,

> CHICAGO RAWHIDE MANUFACTURING COMPANY
>
> Elgin, Illinois

IN THE CLAIMS:

Column 7, 1. 3, the word "head" should be --bead--

Signed and sealed this 8th day of April 1975.

(SEAL)
Attest:

RUTH C. MASON
Attesting Officer

C. MARSHALL DANN
Commissioner of Patents
and Trademarks